INVENTOR.
LEWIS F. JAGGI
ANDREW D. SHEARER
William D. Hall
ATTORNEY

Oct. 23, 1951  L. F. JAGGI ET AL  2,572,033
RECEIVING SYSTEM

Filed Feb. 3, 1945  2 SHEETS—SHEET 2

INVENTOR.
LEWIS F. JAGGI
ANDREW D. SHEARER
BY
William D. Hall
ATTORNEY

Patented Oct. 23, 1951

2,572,033

UNITED STATES PATENT OFFICE 2,572,033

RECEIVING SYSTEM

Lewis F. Jaggi and Andrew D. Shearer,
Dayton, Ohio

Application February 3, 1945, Serial No. 576,100

7 Claims. (Cl. 250—20)

(Granted under the act of March 3, 1883, as
amended April 30, 1928; 370 O. G. 757)

The invention described herein may be manufactured and used by or for the Government for governmental purposes, without the payment to us of any royalty thereon.

This invention relates to radio receivers and, more particularly, to a simplified radio receiver for reproducing or displaying signals, which may be suitable for use in aircraft, vehicles and other mobile units, as well as having general use and is well adapted for use in the reproduction of the radio spectrum or a range of frequencies.

While the field of panoramic receivers is an old and well known one, the tendency in that field has been to employ the superheterodyne circuit or others involving many stages and considerable bulky equipment. While such circuits may be used in aircraft and other mobile units, their use is particularly undesirable from the standpoint of space occupied, weight, and difficulty in repair, necessitating the transportation of many more spare parts.

In other cases, to avoid the additional bulk, weight, and additional power, the desired information is attempted to be collected by the operator of a manually tuned receiver scanning the frequency range and listening with headphones to discover the various signals in the field covered and to ascertain the frequency. Due to the appreciable time period required to scan the field of frequencies of interest, some of the signals are lost or missed so that the spectrum derived from this method is incomplete.

Applicants, with a knowledge of the defects in and objections to the prior art have, for an object of their invention, the provision of a panoramic receiver which will continuously traverse the field of frequencies of interest and which will provide an instantaneous analysis and/or display of signal activity within the limits of the radio spectrum covered by it.

Applicants have, as another object of their invention, the provision of a simplified panoramic receiver which will make possible the construction and use of a smaller receiver than has heretofore been possible with the more complicated circuits now in use.

Applicants have, as another object of their invention, the provision of a panoramic receiver having a simplified circuit, thereby reducing the normal bulk and weight of the receiver and rendering it particularly adaptable for portable or mobile use, such as for aircraft, vehicles, surface craft, field equipment or the like.

Applicants have, as another object of their invention, the provision of a receiver for reproducing signals employing a simplified receiving circuit utilizing a super regenerative detector.

Applicants have, as a further object of their invention, the provision of a receiving circuit employing a simplified system for synchronizing the switch of the display tube with the receiving circuit of the receiver.

Applicants have, as another object of their invention, the provision of a panoramic receiver especially adapted for portable or mobile use for the reproduction of the radio spectrum over a range of frequencies on the base line of a cathode ray tube; and employing a super regenerative detector for simplifying the circuit utilizing a simple system for synchronizing the switch of the cathode ray tube with the tuning circuit and the super regenerative detector.

Other objects and advantages of their invention will appear from the following specification and accompanying drawings, and the novel features thereof will be particularly pointed out in the annexed claims.

Figure 1:
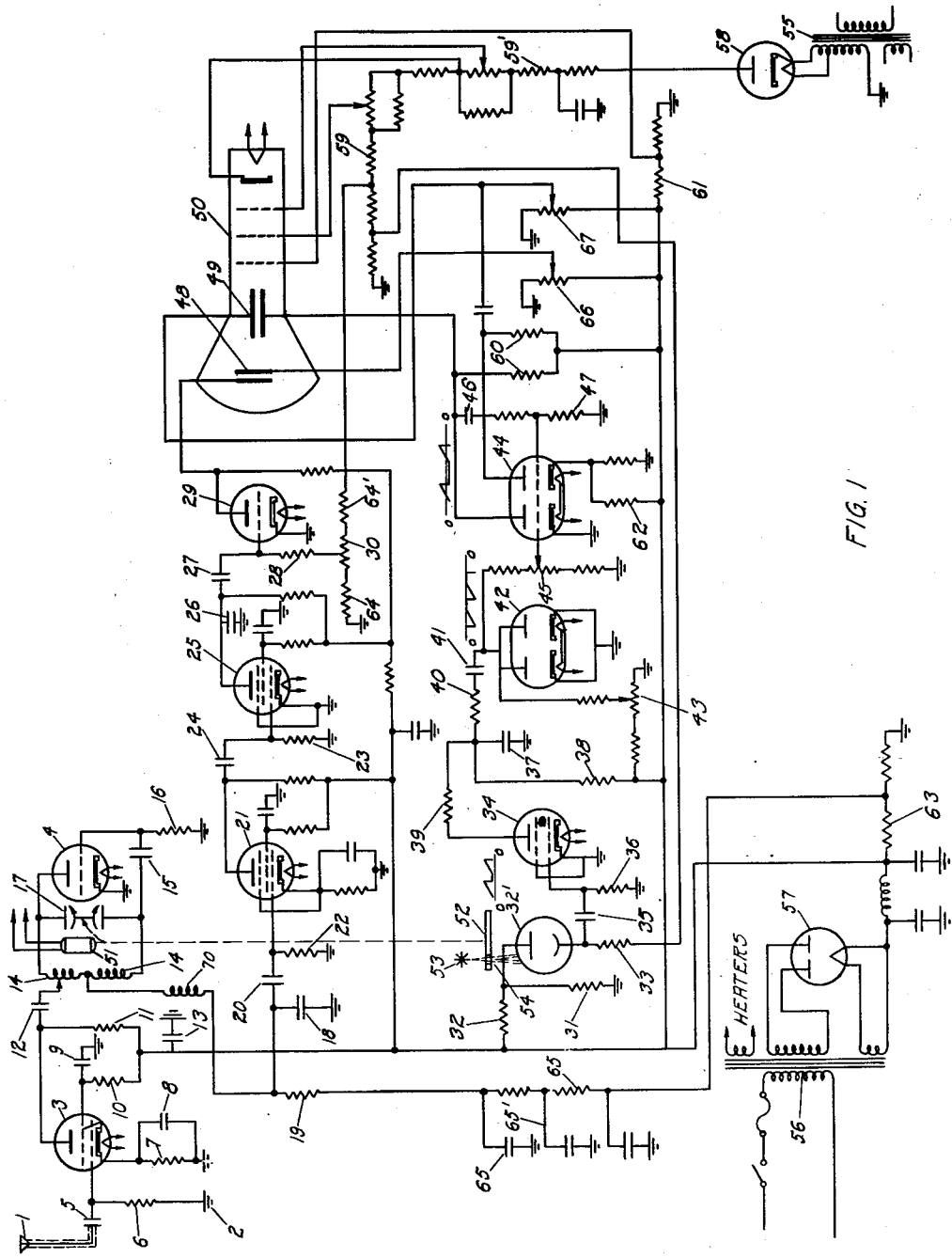
Figure 1 is a detailed circuit diagram of our improved radio receiver.

Referring to the drawings in detail which show one embodiment of the invention, a panoramic receiver for displaying the radio spectrum over a certain range of frequencies of about two to one ratio, such as from about 76 megacycles to 150 megacycles on the base line of a cathode ray tube, is shown. The signals appearing on the cathode ray tube are in the form of pips.

In Figure 1, antenna 1 and ground 2 feed into an untuned R.-F. stage employing a pentode 3 of preferably the 6AG5 type to isolate the antenna 1 from the super regenerative detector 4 in order to reduce interference resulting from the action of the super regenerative detector 4. The antenna 1 is coupled to R.-F. stage 3 through the usual coupling condenser 5 which passes R.-F. so that it may be impressed across grid resistor 6 leading to ground 2.

The cathode circuit of R.-F. stage 3 is provided with a series resistor 7, which provides a grid bias for the tube while condenser 8 serves to by-pass R.-F. to ground. Resistor 10, connected in the screen voltage supply circuit of tube 3, determines the potential of the screen, and condenser 9 serves to ground the screen for R.-F. purposes.

Figure 2:
Figure 2 shows the wave shape of quenched oscillations from super regenerative detector.

Signals from the plate of tube 3 appear across resistor 11, which is connected from the "B" supply source to the plate of the tube, and being coupled through condenser 12 of conventional resistance type coupling, to inductance 14, of the LC circuit 14, 17, is fed through the condenser 15 to the grid of the super regenerative detector 4. As indicated, the inductance 14 and motor driven condenser 17 constitute the LC circuit. Condenser 17 is continuously driven by motor 51 at preferably a rate of speed of about 20 cycles per second. Resistor 16 is simply of the conventional grid bias type. This resistor 16 and condenser 15 determine the quench frequency. The plate supply for tube 4 passes through a portion of tunable inductance 14 entering a tap thereon. Condenser 18 completes the circuit between plate and cathode of tube 4 for passing the quench frequency, and should be sufficiently small to prevent the pulse of plate current due to signal from being by-passed to ground. In the plate supply is an R.-F. choke 70 and a resistor 19. The choke blocks R.-F. currents leaving the output of tube 4. The voltage through resistor 19 provides the input signal for the grid of tube 21. The wave shape of quench frequency is shown in Figure 2. In the absence of incoming signal, oscillations are initiated by the thermal agitation noises, building up to a critical amplitude and quenching.

Figure 3:
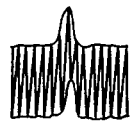
Figure 3 shows the shape of the quenching envelope upon insertion of a signal.

When a signal is received from the R.-F. stage 3, it is fed through the coupling circuit and through condenser 15 to the grid of tube 4. This results in a change of average plate current. The shape of the quenching envelope in the output of the detector is indicated in Figure 3 with the signal pulse indicated therein.

Figure 4:
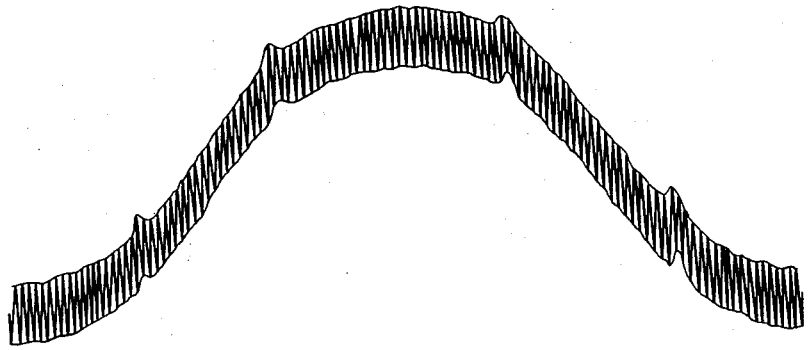
Figure 4 shows the wave shape in the output of the regenerative detector during operation and the reception of a signal.
Figure 5:
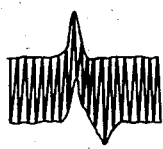
Figure 5 shows the wave shape after elimination of the low frequency component resulting from tuning.

As pointed out above, the condenser 17 is continuously turned, progressively tuning the circuit over the frequency range. The change in the quenching envelope appears as a pip across resistor 19, as indicated in Figure 4, while the large low frequency component of the variation indicated results from the changing LC ratio as the circuit is tuned. Tube 21 is resistance coupled to detector 4 through resistance 22 and condenser 20. The condenser 20 is purposely made small to block out or eliminate the low frequency variation due to the change in plate current by rotation of condenser 17, referred to above. The wave shape of voltage on grid of tube 21, after elimination of this low frequency, is shown in Figure 5. The signals in the form of pulses and oscillations of quench frequency pass through the condenser 20, and appear across resistor 22 as a differentiated pulse and oscillations of quench frequency. This apparent differentiation of the pulses by the circuit, owing to the increased rate of change resulting from the steepened sides of the wave, appears to accentuate the pulses and cause them to build up to a greater amplitude with respect to the quenching envelope. The condenser 20 and resistance 22 are coupled into the control grid of an amplifier 21, preferably a pentode with conventional bias and drop resistors arranged for approximately cut-off bias, as well as by-pass condensers for the cathode and screen grid circuits. The output of tube 21 is then coupled through resistance coupling 23, 24 to the input of amplifier 25. Condenser 24 is purposely made large enough to pass the pulses or variations representing the signals, which are then passed on to amplifier 25 where they are amplified. Since it is only desired to amplify negative voltage swing at this point, the tube is given approximately zero bias.

In the output of plate circuit of tube 25, which has the usual screen grid resistor and condenser, is a condenser 26 which bypasses most of the high frequency quench from the super regenerative detector 4 on to ground, leaving the low frequency signals or pips, together with undesirable low frequency noise and variations. Tube 25 is purposely biased at zero since only positive pulses are amplified by the following stage. These then pass through condenser 27 of the conventional resistance coupling, and on to the control grid of tube 29 which is negatively biased beyond cutoff through adjustable resistor 30, so as to permit energy or signals of only definite positive amplitude to overcome the negative bias of tube 29 and be amplified. Thus, the tube serves as a base line clipper to eliminate noise which is of lesser amplitude than the signals. The output of the clipper tube 29 is then fed to the vertical deflection plates 48 of a cathode ray tube 50.

Now referring to the sweep circuit, anode voltage is supplied through resistor 32 and voltage divider 31 to the anode of a photo-electric tube or cell 32'. The moment light impinges upon photo-electric tube 32', current flows between the cathode and anode through resistor 33 and the cathode of tube 32' becomes less negative. The resulting signal or voltage is impressed upon the control grid of amplifier tube 34, which is preferably a gas filled tube, such as a thyratron. This positive pulse passes through condenser 35 and resistor 36, conventional resistance coupling influencing the grid of tube 34. The plate circuit of tube 34 is connected through protective resistor 39 and on to resistance 38 and condenser 37. The other side of the resistance 38 is connected to the "B" source of power supply, while the other side of condenser 37 is connected to ground. Condenser 37 is charged through resistor 38, but each time a positive pulse is received or impressed upon the grid of thyratron tube 34, it fires, and discharges condenser 37. Condenser 37 will discharge through thyratron 34 until the voltage on the plate of the thyratron 34 will be below the level necessary to keep the tube in a firing condition at which time it will be extinguished and condenser 37 will then be recharged through resistor 38. It should be noted that when the thyratron 34 is fired, the current drawn through resistor 38 is such that a sufficiently great voltage drop will occur across it so that the voltage required to keep the thyratron 34 in a firing condition is supplied solely by condenser 37. Thus a sawtooth wave appears across condenser 37 whose frequency depends upon the frequency of the positive pulse generated across the cathode resistor 33 of phototube 32'. This positive pulse which fires the thyratron tube 34 is illustrated in Figure 1, above thyratron tube 34.

Resistor 40 and condenser 41 in series, couple the sawtooth wave from condenser 37 to the plates of double diode tube 42, whose plates are connected together and are adjusted to have a proper positive bias by means of potentiometer 43 which is connected to the source of power supply. This bias is made less positive than the sawtooth wave peaks. The output from diode tube 42 is then applied through voltage divider 45 to the grid of the first half of the double triode 44. In passing the double diode 42, the peaks of the saw-tooth wave are cut off, as indicated above the tube 42 in Figure 1. Since these peaks are more positive than the bias voltage supplied by potentiometer 43, they will be shorted by diode 42 while the balance of the wave will pass. The resulting signal from the plate of tube 42 varies from the level of the bias potential to a lesser or more negative value since all positive peaks are in effect shorted through the tube 42. Since voltage divider 45, because of its connection to the plates of double diode 42 places a positive potential on the grid of the first triode section of tube 44, the more negative swings of the sawtooth wave which is coupled from the diode 42 will be amplified by the first triode section of tube 44. This will result in correspondingly positive variations in the voltage on the plate of the first triode section of tube 44, which is coupled to the grid of the second triode section of tube 44. The second triode section of tube 44 is biased near cut off to amplify a large positive pulse. As the grid of the first part of double triode 44 is 180° out of phase with the plate voltage, the resulting waves in the output of that part of tube 44 will be inverted. The output of the first part of tube 44 is fed to the grid of the second part of tube 44 through condenser 46 and voltage divider 47. In this way, the output of the two parts of tube 44 are 180° out of phase, and the two parts of the tube act as a push-pull amplifier. The inverted signal appearing in the output of tube 44 is a sawtooth wave, as indicated in Figure 1 above tube 44. The wave is a 90° saw-tooth and the sweep is made to correspond to one-fourth of the rotation of condenser 17, in a manner to be described hereinafter. This is necessary since condenser 17 is a butterfly type condenser requiring 90° rotation for a change from maximum to minimum capacitance.

The sweep voltage from outputs of tubes 44 is then fed to the horizontal deflection plates 49 of the cathode ray tube 50 to provide a sweep for the tube. In order to synchronize the sweep voltage with the tuning circuit of the super regenerative detector 4, a driving motor 51, preferably operated at a speed of about 20 cycles, is joined to and drives the tuning element of the variable condenser 17. It also rotates a disc having a slit 54 therein to permit light from source 52 to periodically pass through the slit and fall upon the light sensitive element of photo tube 32', creating the periodic pulses previously described in connection with the sweep circuit. Since details of construction of this synchronizing means are not a part of this invention, but form the subject of co-pending application, Serial No. 576,872, filed February 8, 1945, Patent No. 2,514,433, they are omitted from this disclosure, as any other appropriate means for accomplishing the same result in substantially the same way will be satisfactory. The various control grids and other elements of cathode ray tube 50, together with the plates, grids, cathodes and heating elements of the other tubes are supplied from conventional sources of power, rectifiers, voltage dividers, filters and networks, 55, 56, 57, 58, 59, 60, 61, 62, 63, 64, 65, 66, 67 and others. Since these sources of supply are conventional, and since their operation and use is well known in the art and form no part of this invention, detailed explanation of them has been omitted from this specification in the interest of simplicity.

Figure 6:
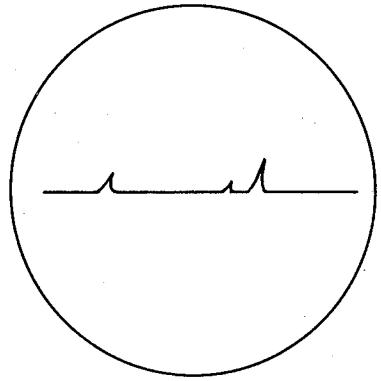
Figure 6 is a plan view of the screen of the cathode ray tube of the receiver.

From the foregoing, it is apparent that motor 51 continuously tunes circuit 14, 17 through condenser 17 over the desired range of frequencies. Signals falling within that frequency range are passed through amplifiers 21, 25 and 29, are amplified, differentiated and separated from the higher frequency components, and from the noises and low frequency variations, and are finally impressed upon the vertical plates of a cathode ray tube 50 and appear as pips on its screen. The sweep circuit of the tube is controlled by the same motor 51 and is synchronized to the operation of the tuned circuit 14, 17 by permitting the light rays from light source 53 to periodically pass through a slit 54 in disc 52, rotated by motor 51. The slit being formed only in a part of disc 52 permits light to pass from source 53 to the light sensitive element of tube 32' where it, through rotation, comes into line with them. The slit being relatively small, the light rays act upon the tube 32 to create pulses which act through tubes 34, 42 and 44, to provide a spaced saw-tooth wave on the horizontal plates 49 of the cathode ray tube 50, in a manner previously described. The blanking space in the saw-tooth preferably covers 270° of rotation of tuning condenser 17, although not limited to such. This is to provide a single position for each frequency on the viewing screen of the cathode ray tube 50. The result, shown in Figure 6, is that the various signals within the frequency range covered appear upon the cathode ray tube screen as vertical pips in a horizontal trace, displaced laterally according to their frequencies, since the base line of the screen may be calibrated in frequency over the frequency range. The radio signal spectrum displayed on the screen is continuous and may be examined by the operator to determine what signals exist and their respective frequencies.

Having thus described our invention, we claim:

1. A panoramic receiver of the character described comprising a tunable super regenerative detector circuit, periodic means for tuning said circuit over a range of signal frequencies to produce signal pulses, means for amplifying and differentiating said pulses to accentuate them, a clipper circuit fed by said last means for removing the low level noise components, a visual electronic indicator for displaying the signal pulses, a sweep circuit connected to said indicator, and means for synchronizing the sweep circuit with said periodic tuning means.

2. A panoramic receiver of the character described comprising a tunable super regenerative detector circuit, periodic means for continuously tuning said circuit to progressively cover a predetermined range of signal frequencies to produce pulses, means for removing the low frequency component resulting from tuning, means for amplifying and differentiating said pulses to accentuate them, a visual indicator fed by said last means, a sweep circuit connected to said indicator, and means for synchronizing the sweep circuit with said periodic tuning means for displaying the signal pulses in the form of pips.

3. A panoramic receiver of the character described comprising a tunable super regenerative detector circuit, periodic means for continuously tuning said circuit to progressively scan a predetermined range of signal frequencies to produce pulses, means for removing the low frequency component resulting from tuning, means for amplifying and differentiating said pulses to accentuate them, a clipper circuit fed by said last means for removing the low level noise components, a visual electronic indicator for displaying the signal pulses, a sweep circuit connected to said indicator, and means for synchronizing the sweep circuit with said periodic tuning means.

4. A panoramic receiver of the character described comprising a tunable super regenerative detector circuit, periodic means for continuously tuning said circuit to progressively scan a range of signal frequencies to produce pulses, means for removing the low frequency component resulting from tuning, means for amplifying and differentiating said pulses to accentuate them, a visual electronic indicator fed by said last means, a sweep circuit for said indicator, and means for synchronizing the sweep circuit with said tuning means for displaying said pulses over the radio spectrum of said frequencies in the form of pips.

5. A panoramic receiver of the character described comprising a tunable super regenerative detector circuit, periodic mechanical means for continuously tuning said circuit over a predetermined range of frequencies to progressively scan the signal frequencies within said range, to produce pulses, means for removing the low frequency component resulting from the tuning, means for amplifying and differentiating said pulses to accentuate them, a clipper circuit for removing the low level noise components, a visual electronic indicator fed by said last means, a sweep circuit for said indicator, and means for synchronizing the sweep circuit with said tuning means for displaying said pulses over the radio spectrum of said range of frequencies in the form of pips.

6. A panoramic receiver of the character described comprising a tunable super regenerative detector circuit, periodic means for tuning said circuit over a range of signal frequencies to produce pulses of quench frequency oscillations, means for amplifying and differentiating said pulses at quench frequency to accentuate them, means for detecting the envelope of said pulses, a visual electronic indicator fed by said last means to display the signal pulses, a sweep circuit connected to said indicator, and means for synchronizing the sweep circuit with said periodic tuning means.

7. A superregenerative panoramic receiver comprising a radio frequency amplifier, an oscillator connected thereto, means coupled to said oscillator for periodically tuning said oscillator through a given range of frequencies, means coupled to said oscillator for filtering out the low frequency components of the output thereof, means coupled to said filtering means for differentiating the output thereof, amplifier means connected to said differentiating means and responsive to the output thereof, means connected to said amplifier means and responsive to the output thereof for eliminating all signals below a given signal amplitude, a cathode ray oscilloscope having vertical and horizontal deflecting plates, means for coupling the output of said signal eliminating means with said vertical deflecting plates, a sweep circuit connected to said horizontal deflecting plates, and means coupled between said sweep circuit and said tuning means for synchronizing the output of said sweep circuit with said periodic tuning.

LEWIS F. JAGGI.
ANDREW D. SHEARER.

REFERENCES CITED

The following references are of record in the file of this patent:

UNITED STATES PATENTS

| Number | Name | Date |
|---|---|---|
| 1,483,172 | Gannett | Feb. 12, 1924 |
| 1,994,232 | Shuck, Jr. | Mar. 12, 1935 |
| 2,312,203 | Wallace | Feb. 23, 1943 |
| 2,367,907 | Wallace | Jan. 23, 1945 |
| 2,378,604 | Wallace | June 19, 1945 |

FOREIGN PATENTS

| Number | Country | Date |
|---|---|---|
| 834,082 | France | Aug. 1, 1938 |

OTHER REFERENCES

"Panoramic Reception, etc.," a publication of M. Wallace, New York, New York, May 14, 1938, 17 pp.